United States Patent
Yan

[11] Patent Number: 5,422,560
[45] Date of Patent: Jun. 6, 1995

[54] BATTERY CHARGER WITH BATTERY DETECTION CIRCUIT

[75] Inventor: Raymond C. Yan, Daly City, Calif.

[73] Assignee: TelCom Semiconductor, Inc., Mountain View, Calif.

[21] Appl. No.: 34,175

[22] Filed: Mar. 18, 1993

Related U.S. Application Data

[63] Continuation of Ser. No. 769,944, Sep. 30, 1991, abandoned.

[51] Int. Cl.⁶ .............................................. H02K 7/04
[52] U.S. Cl. .................................................... 320/31
[58] Field of Search ............................ 320/15, 22–24, 320/35, 36, 31

[56] References Cited

U.S. PATENT DOCUMENTS

| | | | |
|---|---|---|---|
| 4,577,144 | 3/1986 | Hodgman et al. | 320/21 X |
| 4,584,514 | 4/1986 | Kaminski | 320/33 |
| 4,602,204 | 7/1986 | Hase | 320/30 |
| 4,629,965 | 12/1986 | Fallon et al. | 320/20 X |
| 4,670,703 | 6/1987 | Williams | 320/21 X |
| 4,746,852 | 5/1988 | Martin | 320/21 X |
| 5,013,992 | 5/1991 | Eavenson et al. | 320/31 |

Primary Examiner—Steven L. Stephan
Attorney, Agent, or Firm—Skjerven, Morrill, MacPherson, Franklin & Friel

[57] ABSTRACT

A battery charger including a battery detector at a node at which a battery is connectable. When a battery is not present, a voltage at the node fluctuates, but when a battery is present, the battery holds the voltage substantially constant. A level shifter shifts the voltage at the node. If no battery is present, the shifted voltage will fall below a predetermined threshold, but if a battery is present, the shifted voltage will remain above the predetermined threshold. A ground sense comparator detects whether or not the shifted voltage is below the predetermined threshold, and provides a battery detection signal accordingly. A controllable charge driver couples power from a power supply through to a battery, to charge the battery. An integrated circuit provides logic functions of the apparatus, including logic functioning as a charge controller. The charge controller is responsive to the battery detection signal to provide a charge drive signal to turn on the controllable charge driver only if a battery is present. The battery charger is capable of fast charging a wide variety of batteries according to a user-selectable charge rate.

16 Claims, 8 Drawing Sheets

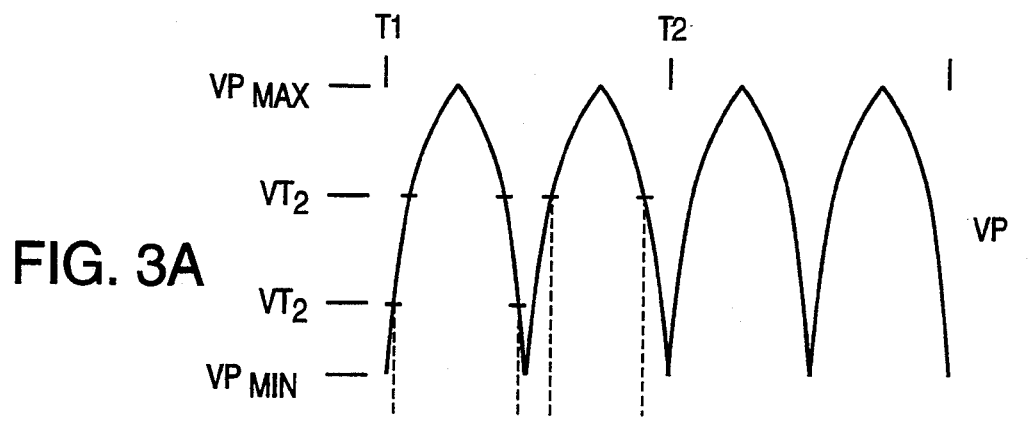
FIG. 3A
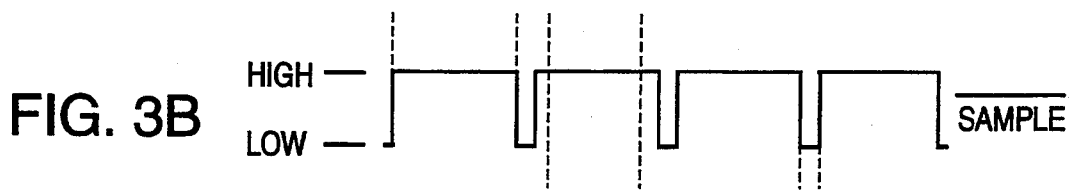
FIG. 3B
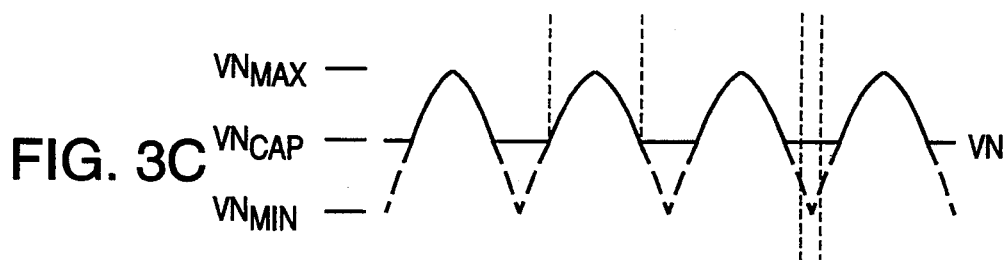
FIG. 3C
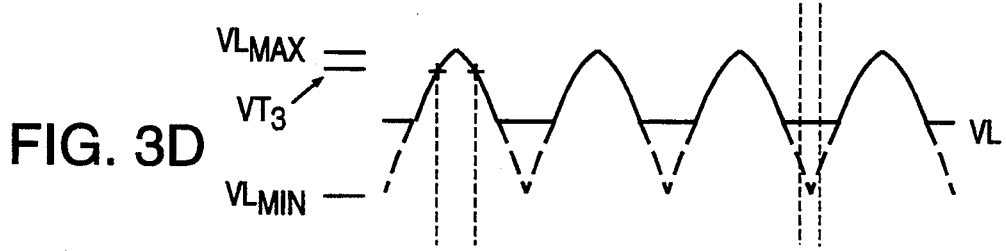
FIG. 3D
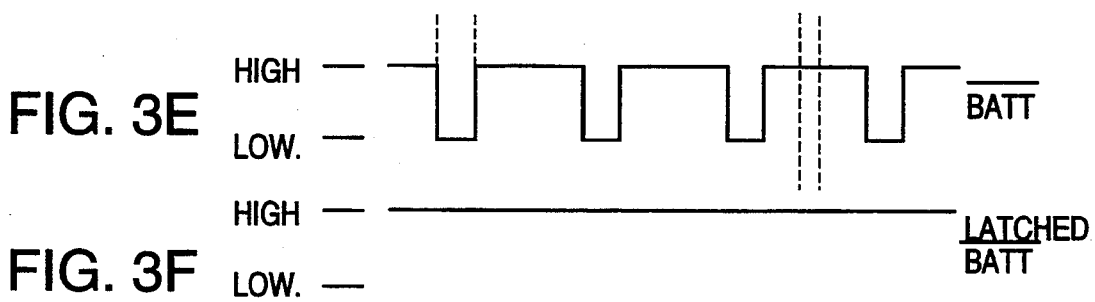
FIG. 3E
FIG. 3F

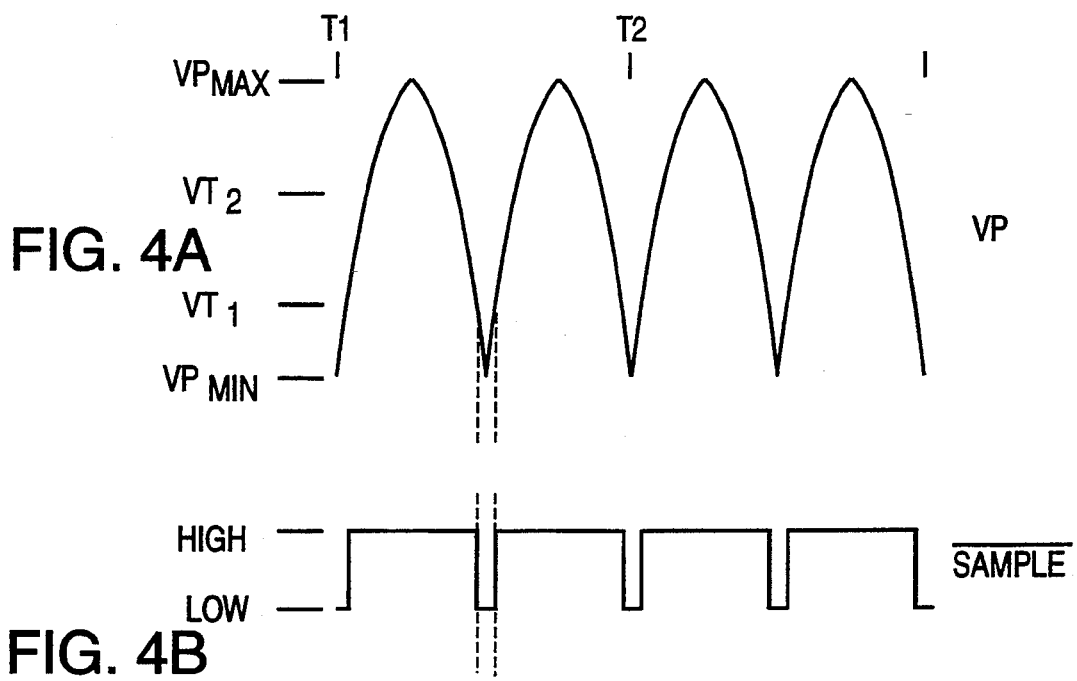
FIG. 4A
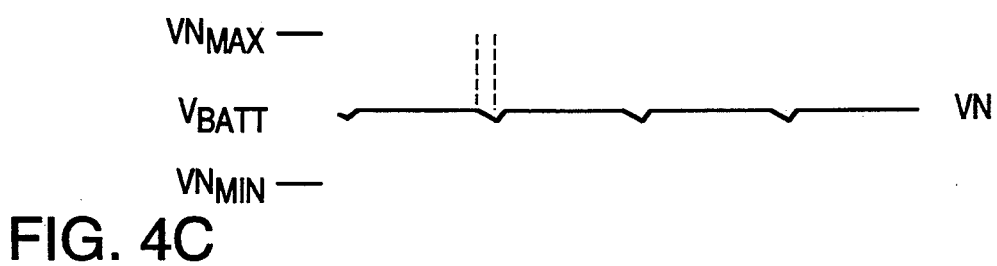
FIG. 4B
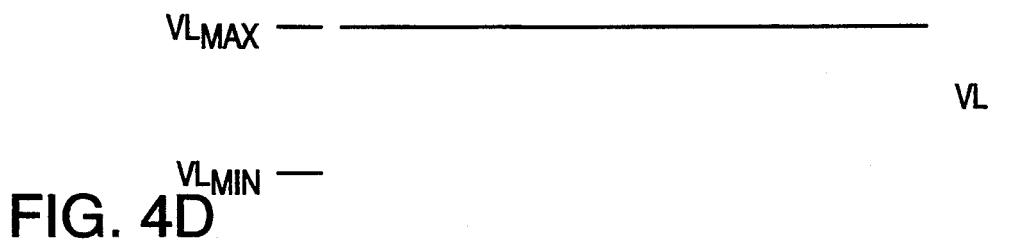
FIG. 4C
FIG. 4D
FIG. 4E
FIG. 4F

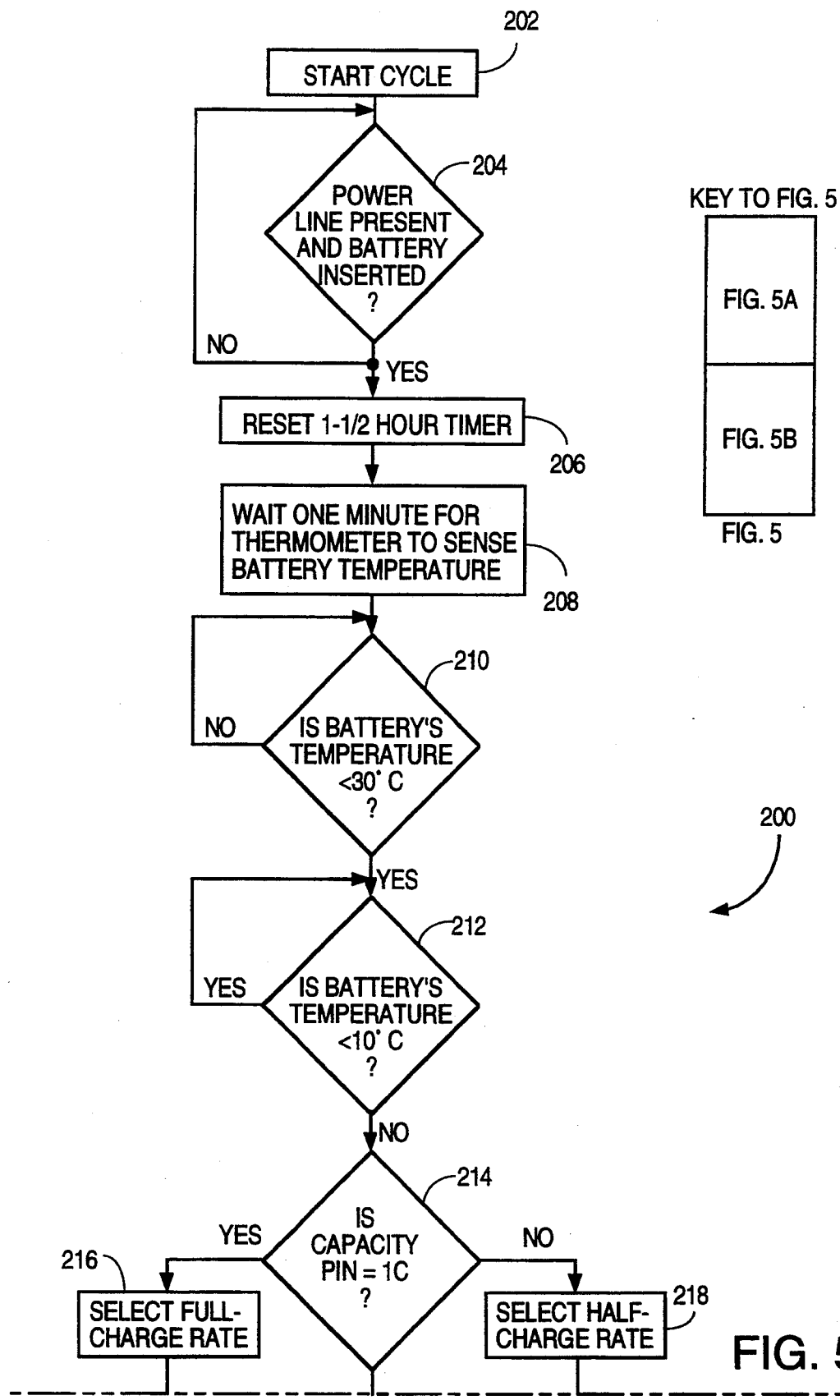

BATTERY CHARGER WITH BATTERY DETECTION CIRCUIT

This application is a continuation of Ser. No. 07/769,944, filed Sep. 30, 1991, now abandoned.

CROSS-REFERENCE TO RELATED APPLICATION

U.S. Patent Application entitled "BATTERY CHARGER WITH POWER SWITCHING BETWEEN CHARGE DRIVER AND LOGIC CIRCUITRY", Ser. No. 07/768,176 filed Sep. 30, 1991 (now abandoned) the subject matter described herein, and is incorporated herein by reference.

BACKGROUND OF THE INVENTION

1. Field of the Invention

The present invention relates generally to battery chargers, and more particularly to a charger for safe fast-charging of batteries, which may have widely varying power and charge characteristics, without interfering with logic operations of the charger.

2. Description of the Background

A rapidly growing array of devices utilize nickel-cadmium (NiCd) batteries as a rechargeable, portable power source. A battery's size determines, in large measure, the overall power capacity of the battery. In general, a larger battery will remain charged and able to provide power longer than a smaller battery, when subjected to identical load conditions. Many devices place great demands on their batteries, yet require those batteries to be of relatively small size. In other words, many devices discharge their batteries in a relatively short period of time.

Many such devices are desirable to be kept in substantially constant operation. For example, consider a carpenter who makes almost constant use of a cordless drill operating on a 9.6 volt NiCd battery which fits within the drill's handle. The small size of the battery, coupled with the substantial power requirements of the drill, means that the battery will be discharged in a period of time perhaps as short as one hour or less. While the battery is being recharged, the carpenter cannot work, unless he has a spare, charged battery.

The longer the charging period of the battery, the more spares (and chargers) the carpenter must have on hand. Thus, it is highly desirable to have a battery charger which is capable of fully charging a discharged battery in as short a time as possible. In particular, if the charging period is not longer than the discharging period, the user needs only two batteries— one in use, and one being charged—and the user needs only one battery charger.

The desired charging time ($C_{time}$), the available charge current ($I_{charge}$), and the given battery's charge capacity ($AH_b$) combine to define a "C rating" of the particular charging method:

$$C \text{ rating} = (C_{time} * I_{charge})/AH_b$$

Under theoretically ideal conditions, for a battery having a 400 milliampere-hour charge capacity, a 400 milliampere charge current will fully charge the battery in one hour. This is the "C rate" charging method. If only 200 milliamperes of charge current are available, it will take two hours to charge the battery. This is the "C/2 rate" or "0.5 C rate". If the battery must be charged within a half hour, a "2 C rate" must be used, requiring an 800 milliampere charge current.

However, in practice, a C rate charge will not fully charge a battery in one hour, owing to various inefficiencies in the battery and the charger, such as heat generation caused by electrical resistance. The following Table 1 illustrates commonly accepted definitions of C ratings:

TABLE 1

| Charge Method | C rating | Charge Time (hours) |
|---|---|---|
| Trickle | C/50 to C/10 | (used to maintain fully charged batteries) |
| Standard | C/20 | 36–48 |
|  | C/10 | 16–20 |
| Quick | C/5 | 7–9 |
|  | C/4 | 5–7 |
|  | C/3 | 4–5 |
| Past | C | 1.2 |
|  | 2C | 0.6 |
|  | 3C | 0.3 |

There are several problems with the "fast" charging of NiCd batteries. First, because internal pressure within a NiCd battery increases as a function of the charge current, if a NiCd battery is charged too quickly, it may explode, causing the loss of the battery, probable damage to the charger, and perhaps great harm to bystanders. Second, because temperature within a NiCd battery increases as a function of the charge current, if the battery is too hot, it will explode. Third, if a NiCd battery is too cold, it will not take a charge. And fourth, attempting to further charge an already fully-charged battery ("overcharging") may also cause harm to the battery, and is wasteful of the electrical supply power.

The user may need a wide variety of NiCd batteries, each with unique power and charging characteristics. For example, the carpenter may use a 9.6 volt battery in a drill, a 1.5 volt battery in a penlight, a 6 volt battery in a handheld calculator, and a 24 volt battery in a motorized shop cart. For the carpenter, it is financially desirable that each type of battery not require its own charger.

It is also financially desirable to the carpenter to reduce wear and tear on the charger and to avoid wasting electrical power. Thus, it is desirable that the charger's most power-consuming components remain in an unpowered or at least "stand-by" state when no battery is present for charging. One possible solution is to simply unplug the charger from its power supply when not in use. This is somewhat inconvenient, and has the drawback that one may forget to plug the charger in when inserting a battery for charging, resulting in down-time for the battery-powered devices which rely on that battery. This solution has the further drawback that one may also forget to unplug the charger after removing the battery, leaving the charger powered and attempting to charge a battery when none is present. This wastes power and reduces the serviceable lifetime of the charger. Another possible solution is to provide an on/off switch, but this is essentially the same as the first solution.

A more elegant solution is to have a battery charger which automatically detects whether there is a battery coupled for charging, and which takes itself into a low power "sleep" mode or stand-by state when no battery is present, or when the battery has become fully charged.

SUMMARY OF THE INVENTION

The present invention provides a battery detector for detecting the presence or absence of a battery which has terminals electrically connectable to and removable from the battery charger.

The battery detector includes a battery detection node at which a terminal of the battery is electrically connectable to the apparatus. When a battery is not present, a voltage at the battery detection node fluctuates, but when a battery is present, the battery holds the voltage at the battery detection node substantially constant. The battery detector operates by detecting whether or not the voltage at the battery detection node is fluctuating.

The battery detector further includes a level shifter coupled at the battery detection node and at a ground sense input node. The level shifter shifts the voltage at the battery detection node into a different range shifted voltage at the ground sense input node. If no battery is present, the voltage at the ground sense input node will fall below a predetermined threshold, but if a battery is present, the voltage at the ground sense input will remain above the predetermined threshold.

The battery detector still further includes a ground sense comparator coupled at the ground sense input node. The ground sense comparator detects whether or not the voltage at the ground sense input node is below the predetermined threshold, and provides a battery detection signal accordingly.

The apparatus further includes a controllable charge driver, such as a silicon-controlled rectifier, for coupling power from a power supply through to a battery, to charge the battery.

The apparatus still further includes an integrated circuit providing logic functions of the apparatus. For example, the integrated circuit includes logic functioning as a charge controller. The charge controller is responsive to the battery detection signal to provide a charge drive signal to turn on the controllable charge driver. When no battery is present, no battery detection signal is provided, so no charge drive signal is provided, and power consumption of the battery charger is greatly reduced, with the battery charger entering a sleep state.

The battery charger is capable of fast charging a wide variety of batteries according to a user-selectable charge rate.

BRIEF DESCRIPTION OF THE DRAWINGS

FIGS. 3A-F are signal graphs showing relationships between various signals generated within the battery charger, when there is no battery present for charging.

FIGS. 4A-F are signal graphs showing relationships between various signals generated within the battery charger, when a battery is present for charging.

DETAILED DESCRIPTION OF THE PREFERRED EMBODIMENTS

I. Components of the Battery Charger

Figure 1A:
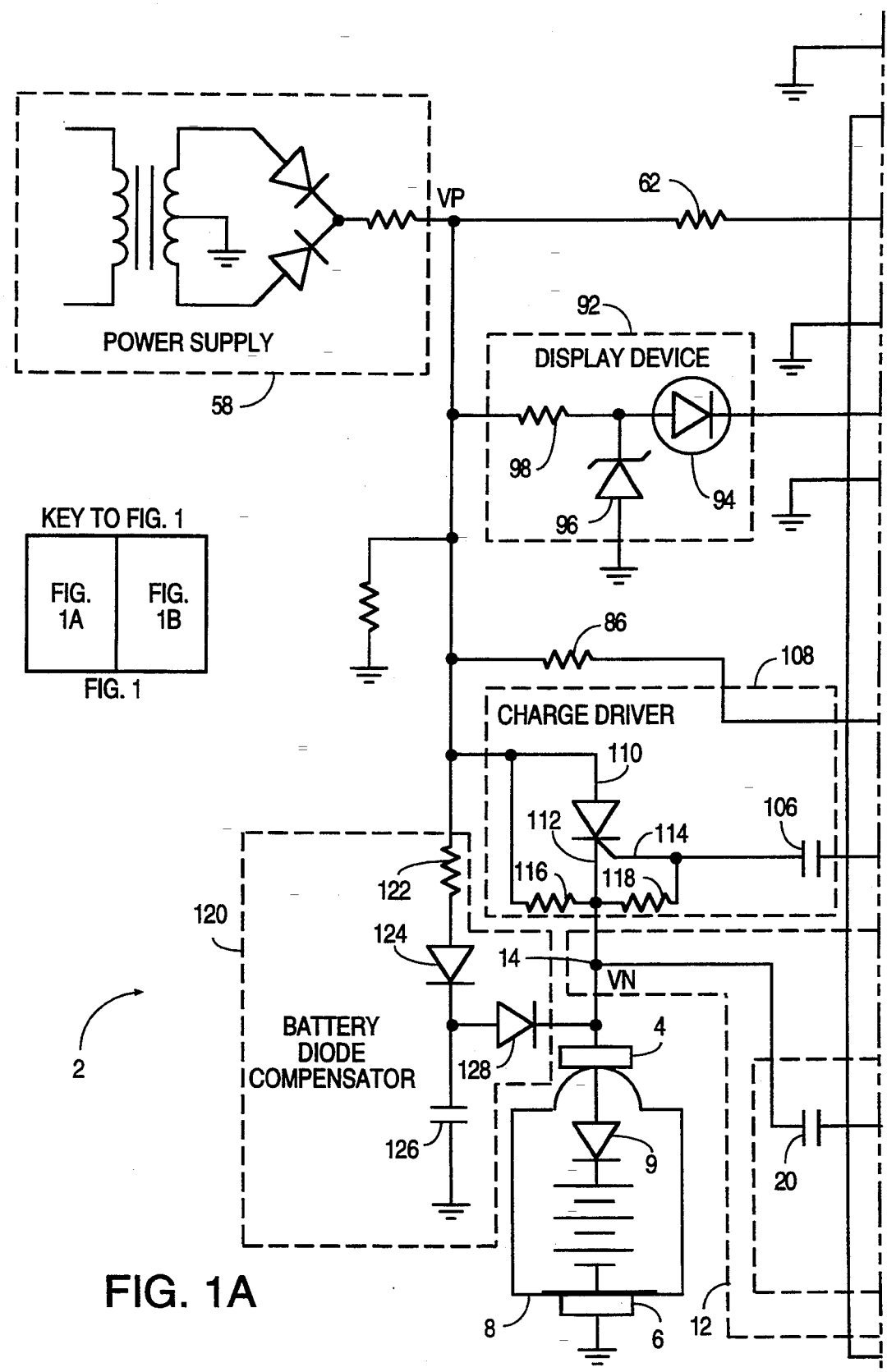
FIG. 1 illustrates the general components of the battery charger, in block and schematic form.
Figure 1B:
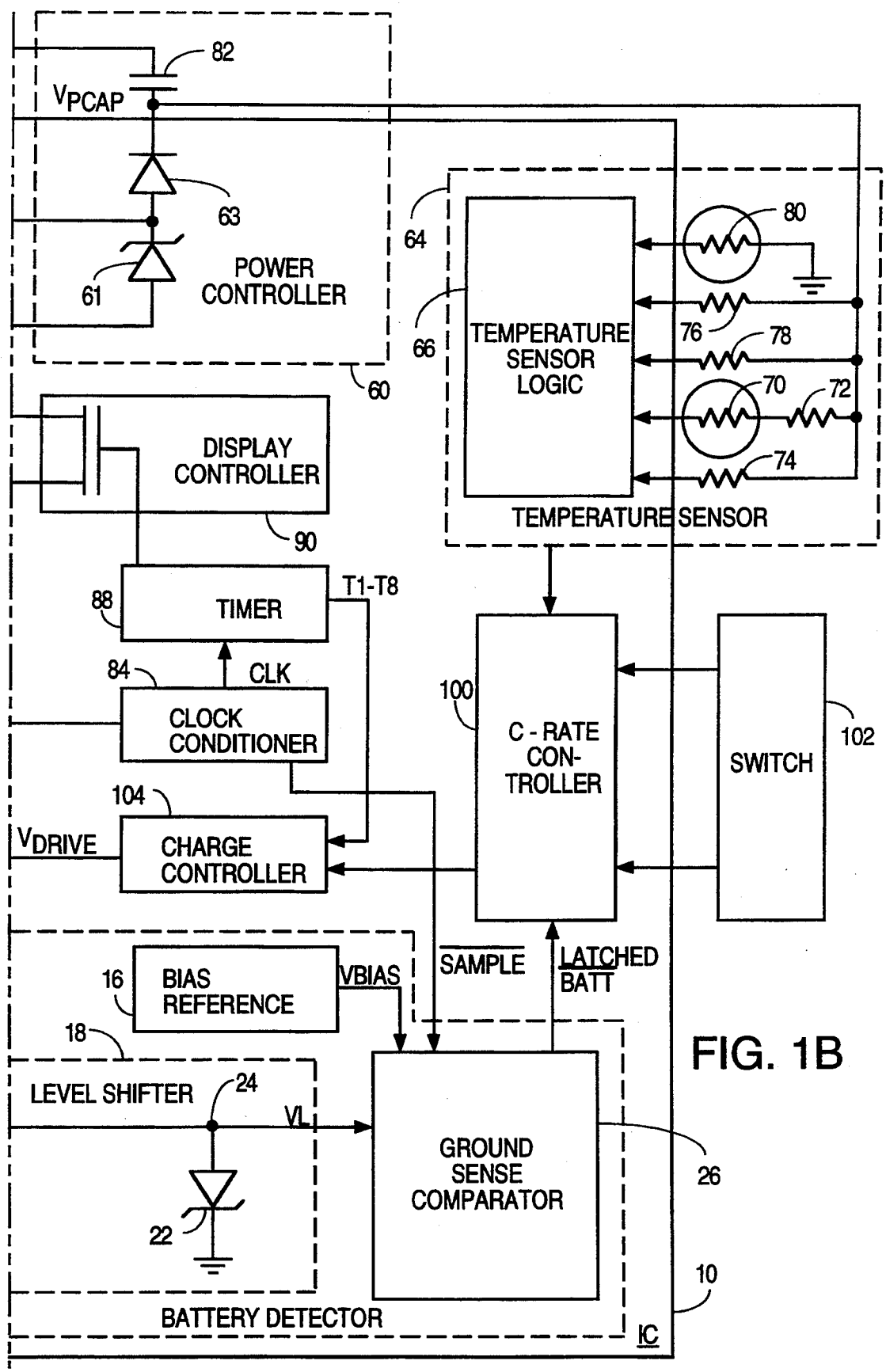

FIG. 1 illustrates the components of the battery charger 2 of the present invention. The battery charger includes first and second battery contacts 4 and 6 at which a battery 8 may be inserted for charging. The invention may be used for charging batteries which have, or those which do not have, an internal battery diode 9 such as is sometimes found in NiCd batteries.

In one mode, many of the functions of the battery charger 2 may be embodied within an integrated circuit (IC) 10. The integrated circuit may include a logic-performing device such as a microprocessor or a programmable logic array device (not shown) for performing logical control operations of the battery charger 2. The logic functions may be embodied as software and/or hardware.

II. Components of the Battery Detector

The battery charger includes a battery detector 12 coupled to the first battery contact 4 at a battery detection node 14. The battery detector 12 includes a bias reference circuit 16, the details of which are not important for understanding the present invention.

A. Components of the Level Shifter

The battery detector 12 further includes a level shifter 18 having an input coupled at the battery detection node 14. The level shifter 18 includes a DC blocking capacitor 20 and a zener diode 22. In one mode, the DC blocking capacitor 20 is external to the IC 10, while the zener diode 22 is constructed within the IC 10. As seen more clearly in FIG. 2, the level shifter 18 accepts input at the battery detection node 14 which is coupled to the first battery contact 4, and provides output at a ground sense input node 24. The DC blocking capacitor 20 is coupled between the battery detection node 14 and the ground sense input node 24. The zener diode 22 is coupled between the ground sense input node 24 and ground, as shown.

B. Components of the Ground Sense Comparator

Figure 2:
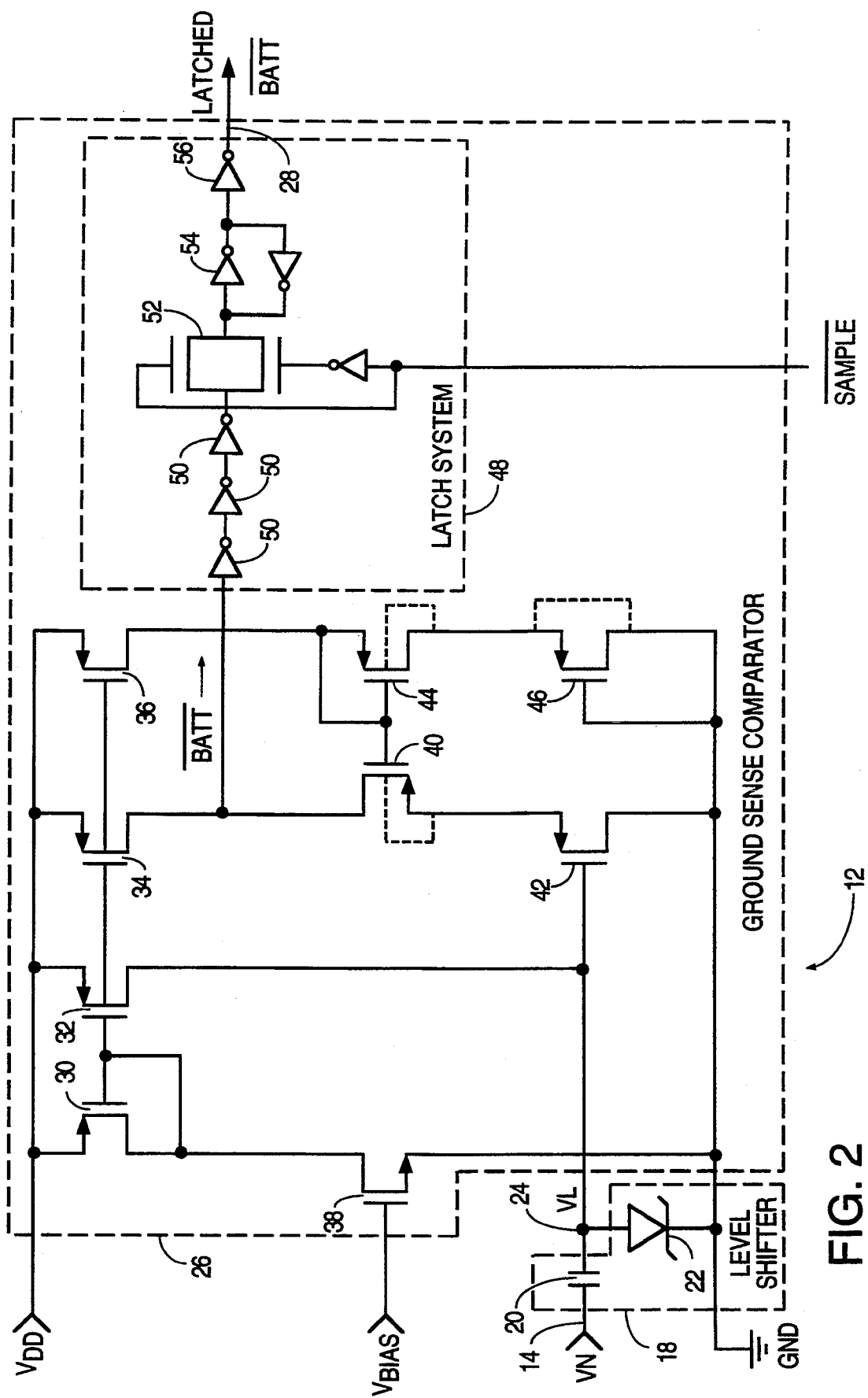
FIG. 2 is a schematic diagram of the components of the battery detection circuitry of the present invention.

As seen in FIG. 2, the battery detector 12 also includes a ground sense comparator (GSC) 26, which is coupled to the ground sense input node 24 to receive input at the ground sense input node 24, and which provides output at a ground sense output node 28.

The ground sense comparator 26 includes first, second, third, and fourth gate-coupled transistors 30, 32, 34, and 36, each having its source coupled to receive a power signal $V_{PCAP}$, which may, for example, be 5 volts DC. The gate and drain of the first transistor 30 are connected to each other and to the drain of a fifth transistor 38. The gate of the fifth transistor 38 is coupled to receive the signal $V_{BIAS}$ from the bias reference circuit 16. The drain of the third transistor 34 is coupled to the source of a sixth transistor 40, which has a drain coupled to the source of a seventh transistor 42. The seventh transistor 42 has a gate coupled to the drain of the second transistor 32 and to the ground sense input node 24. An eighth transistor 44 has its source coupled to the drain of the fourth transistor 36, its gate coupled to the gate of the sixth transistor 40, and its source and gate coupled together. A ninth transistor 46 has its source coupled to the drain of the eighth transistor 44. The drain of the fifth transistor 38, the drain of the seventh transistor 42, and the gate and drain of the ninth transistor 46 are all tied to ground.

The GSC 26 further includes a latch system 48 coupled to the drain of the third transistor 34. The latch system 48 includes three serially-connected waveform-sharpening inverters 50, which are optional but advantageous. A pass gate 52 is coupled to the output of the final waveform-sharpening inverter 50. A latch 54 is coupled to the pass gate 52, and a final inverter 56 couples the latch 54 to the ground sense output node 28.

III. Components of the Power Supply and the Power Controller

Please refer again to FIG. 1. The battery charger 2 includes a power supply 58, which performs voltage step-down and AC-to-DC conversion. It will be understood that the power supply 58 may be either internal or external to the remainder of the apparatus, and its details are not of critical importance to understanding the present invention. All that is required is that the power supply provide a DC voltage which is at least as great as the highest-voltage battery which is to be charged by the battery charger 2.

The battery charger 2 also includes a power controller 60, which receives the power signal from the power supply 58 through a current-limiting resistor 62, and which provides electrical power to various other components of the battery charger 2. As one example, the power controller 60 provides the signal $V_{PCAP}$ which powers the ground sense comparator 26. In the interest of clarity, the connections between the power controller 60 and the other components are not shown.

In one mode, the power controller 60 may simply be a reverse-biased zener diode 61 which has a zener operating voltage appropriate for powering the IC 10, such as approximately 5 volts. The power controller further includes a power supply capacitor 82, which may be external to the IC 10. The details of operation of the power supply capacitor 82, the zener diode 61, and the power supply 58 and power controller 60 in general may be further understood with reference to the cross-referenced Application entitled "BATTERY CHARGER WITH POWER SWITCHING BETWEEN CHARGE DRIVER AND LOGIC CIRCUITRY", particularly as they interact with the charge controller 104 and charge driver 108.

IV. Components of the Temperature Sensor

The battery charger 2 further includes a temperature sensor 64, which receives temperature information concerning the battery 8 and the ambient environment around the battery charger 2. The temperature sensor 64 includes temperature sensor logic 66 within the IC 10. The temperature sensor 64 includes other components which are connected to the power controller 60 through diode 63, and which may be either internal or external to the IC 10. A thermistor 70 and resistor 72 are coupled to one input pin of the IC 10, a maximum start temperature resistor 74 is coupled to another input pin, a minimum battery temperature resistor 76 is coupled to another input pin, an absolute battery overheat temperature resistor 78 is coupled to yet another input pin, and a battery temperature thermistor 80 is coupled to still another input pin of the IC 10. The resistors 72, 74, 76, and 78 are coupled to directly receive $V_{PCAP}$, and are also coupled to ground through capacitor 82, while battery temperature thermistor 80 is coupled directly to ground.

In one mode, the resistor 72 is a 153 kilo-ohm resistor, the maximum start temperature resistor 74 is an 87 kilo-ohm resistor, the minimum battery temperature resistor 76 is a 496 kilo-ohm resistor, the absolute battery overheat temperature resistor 78 is a 27 kilo-ohm resistor, and the battery temperature thermistor 80 provides 100 kilo-ohms resistance at 25° C.

V. Components of the Clock Conditioner and the Timer

The battery charger 2 also includes a clock conditioner 84, which is connected to the power supply 58 through a current-limiting resistor 86. The clock conditioner is coupled to the pass gate within the GSC 26 (shown in FIG. 2).

The clock conditioner is also connected to a timer 88 which performs timing operations of the battery charger 2. Further details of the clock conditioner and the timer will be understood with reference to the cross-referenced Application.

VI. Components of the Display Controller and the Display Device

The timer 88 is connected to a display controller 90. In one mode, the display controller 90 may include a field effect transistor (FET) whose gate is coupled to receive a control signal from the timer 88.

The display controller 90 is connected to a display device 92, which displays various data to a person using the battery charger. In one embodiment, the display device 90 indicates the operating mode of the charger. In other modes, the display device might also indicate the time remaining until the battery will be fully charged, the battery temperature, the ambient temperature, and the like.

In one mode, the display device 92 includes a light-emitting diode (LED) 94, a zener diode 96, and a resistor 98. When the battery charger is performing a fast charge on a battery, the display controller 90 lights the LED 94. The zener diode 96 protects the display controller 90 and the LED 94 by limiting the voltage applied across them. The resistor 98 protects the LED 94 and the display controller 90 by limiting the current passed through them.

VII. Components of the C-Rate Controller

The operating mode is set, in part, by rate select signals received by a C-rate controller 100 from a user-selectable mode selection switch 102. The switch 102 is used to select whether the battery charger 2 performs a fast charge or only a trickle charge. The C-rate controller 100 is also responsive to the temperature sensor 64 and the battery detector 12.

VIII. Components of the Charge Controller and Charge Driver

The C-rate controller 100 and the timer 88 are coupled to a charge controller 104. The charge controller 104 is coupled through a DC blocking capacitor 106 to a charge driver 108. The charge driver 108 couples the power supply 58 to the first battery contact 4. The charge driver 108 includes a first power terminal 110 which is coupled to the power supply 58, and a second power terminal 112 which is coupled to the first battery contact 4. The charge driver 108 also has a control terminal 114 to which the charge controller 104 is coupled through the DC blocking capacitor 106. A resistor 116 couples the first power terminal 110 to the second power terminal 112, and a resistor 118 couples the control terminal 114 to the second power terminal 112.

In one mode, the charge driver 108 may be a silicon-controlled rectifier (SCR), in which the first power terminal 110 is an anode, the second power terminal 112 is a cathode, and the control terminal 114 is a gate. The advantages obtained by using an SCR are its low manufacturing cost and high reliability. In one mode, the power supply signal is a positive voltage with respect to ground, and the SCR's cathode 112 is coupled via the first battery contact 4 to the battery's positive supply terminal, and the battery's negative supply terminal is connected through the second battery contact 6 to ground. In other modes, the reverse configuration may also be used, to recharge the battery with a negative voltage applied to the battery's negative supply terminal.

IX. Components of the Battery Diode Compensator

If the battery charger 2 is to be used in charging a battery 8 which has an internal battery diode 9 as shown in FIG. 1, the battery charger 2 may further include a battery diode compensator 120. The battery diode compensator includes a resistor 122, a diode 124, and a capacitor 126 connected in series between the power supply 58 and ground, and a diode 128 connected between the diode 124 and the first battery contact 4.

X. Operation of the Power Supply

Please make reference now to FIGS. 1, 2 and 3A-F. FIGS. 3A-F show waveforms which occur at various points within the battery charger 2, when no battery is present for charging. FIG. 3A shows the fully rectified DC waveform at the output of the center-tapped transformer in the power supply 58. The FIG. 3A waveform, hereinafter referred to as the power supply signal VP, cycles between a low voltage $VP_{MIN}$ identical to the voltage applied at the center tap, such as ground or 0 volts DC, and a high voltage $VP_{MAX}$ which is determined by the various components of the power supply in order to provide an adequate signal VP. $VP_{MAX}$ should be greater than the voltage rating of the highest-voltage battery to be charged by the battery charger 2, and may, in one mode, be 24 volts DC.

XI. Operation of the Clock Conditioner and the Timer

It has been observed that, for logic functions of this invention, a sufficiently rapid clock is available from the 60 Hz signal provided by the standard AC power supply lines to which the power supply 58 is connected. As will be understood from FIG. 3A, this analog clock has a period of approximately 8.3 milliseconds thus:

$$8.3 \text{ sec} = \frac{1}{60 \text{ Hz} * 2 \text{ rectified half waves per cycle}}$$

If additional features are added to the apparatus, which require faster clocking, it may prove advantageous to add a separate clock supply, such as an 8 MHz crystal or the like, rather than taking the clock from the AC power supply signals. This would, of course, require additional modifications to various other components in the battery charger, to maintain signal synchronization.

Further details of the operation of the clock conditioner and the timer are explained in the cross-referenced Application.

XII. Operation of the Clock Conditioner

Within the clock conditioner 84, the analog power supply signal VP is converted to the binary sample signal $\overline{SAMPLE}$ of FIG. 3B. The details of how this is done are not particularly important for understanding the present invention. Suffice it to state that $\overline{SAMPLE}$ is high when VP is above a first threshold $VT_1$, and is low when VP is below that threshold $VT_1$.

XIII. Operation of the Battery Detector

The operation of the bias reference circuit 16 is not particularly important to understand the present invention. Suffice it to state that the bias reference circuit 16 provides a stable reference signal $V_{BIAS}$ suitable for use as a voltage reference. For example, one method of stable reference construction is described in U.S. Pat. No. 4,935,690 to Raymond C. Yan.

A. General Operation of the Level Shifter

The voltage at the battery detection node 14 is defined to be a signal VN. The state of VN depends upon whether there is, or is not, a battery present for charging, as will be explained below. The level shifter 18 accepts VN and provides an output signal VL at the ground sense input node 24 in response thereto, as will be explained below.

B. General Operation of the Ground Sense Comparator

The ground sense comparator 26 accepts the signal VL at the ground sense input node 24, and provides an output signal $\overline{BATT}$ in response thereto, as will be explained below.

C. Detection of Battery Absence

1. Operation of the Level Shifter During Battery Absence

Assume now that there is no battery present for charging. When there is no battery, VN fluctuates as shown in FIG. 3C, and thus VL fluctuates as shown in FIG. 3D. With VP at its maximum, the voltage VN at the battery detection node 14 will also be at a maximum $VN_{MAX}$, as seen in FIGS. 3A and 3C. As VP begins to fall, VN will also fall. However, when VP falls below a second threshold $VT_2$, VN will be clamped by discharge of the DC blocking capacitor 20 in the level shifter 18. Without this clamping, VN would fall to $VN_{MIN}$, as shown in FIG. 3C by broken lines in the waveform.

As seen in FIGS. 3C and 3D, the shape of the VL waveform at the ground sense input node 24 closely tracks the shape of the VN waveform at the battery detection node 14, with slight variance due to the DC blocking capacitor 20. VL is shifted in voltage range, but not necessarily in phase, from VN.

VL is in a range between $VL_{MIN}$ and $VL_{MAX}$. Within this shifted range, there is a third threshold $VT_3$, which is preselected to simplify the operation of the ground sense comparator 26, as explained below. In one mode, the third threshold $VT_3$ may be approximately 0.7 volts below $VL_{MAX}$ according to the forward silicon drop across the junction of the zener diode 22 in the level shifter 18.

As VN rises, a voltage $V_{CAP}$ across the DC blocking capacitor 20 rises as well. During this time, the zener diode 22 is forward biased, and only the 0.7 volt drop is seen across the zener diode 22. As VN peaks out and starts to drop, VL must also drop, in order that the sum of the voltage drops between the battery detection node 14 and ground will add up properly. Thus, while VL is dropping, there must be a negative voltage at the ground sense input node 24 because of the stored positive $V_{CAP}$ across the DC blocking capacitor 20, and the zener diode 22 must thus be reverse biased. After the system stabilizes, in approximately one or two cycles, the DC blocking capacitor 20 and the zener diode 22 will function as a level shifter to convert the VN waveform of FIG. 3C to the VL waveform of FIG. 3D.

2. Operation of the Ground Sense Comparator During Battery Absence

When VL is above $VT_3$, the signal $\overline{BATT}$ at the drain of the third transistor 34 goes low as the eighth transistor 44 shuts off, and when VL is below $VT_3$, $\overline{BATT}$ goes high as the eighth transistor 44 opens up (becomes conductive). The critical portion of the waveform of the $\overline{\text{BATT}}$ signal occurs during the active low portion of the $\overline{\text{SAMPLE}}$ signal. As seen in FIGS. 3B and 3E, when no battery is present, $\overline{\text{BATT}}$ is high each time goes low. An advantageous feature of this invention is that the narrow active low pulses of $\overline{\text{SAMPLE}}$ are centered within the relatively wide high pulses of $\overline{\text{BATT}}$, maximizing the surety that a correct $\overline{\text{BATT}}$ value is sampled. $\overline{\text{BATT}}$ passes through the waveform-sharpening inverters 50, and arrives at the pass gate 52.

The pass gate 52 is clocked by $\overline{\text{SAMPLE}}$ during the broad, active cycle of $\overline{\text{BATT}}$. The signal from the pass gate 52 passes through the latch 54 to the final inverter 56. The inverter 56 outputs the battery detection signal LATCHED $\overline{\text{BATT}}$ as the final output of the battery detector 12, as shown in FIG. 3F.

Thus, by observing FIGS. 3B and 3E, it will be understood that when there is no battery present, the active low pulses of $\overline{\text{SAMPLE}}$ will occur during the high phase of $\overline{\text{BATT}}$. When no battery is present, the LATCHED $\overline{\text{BATT}}$ output of the battery detector 12 will remain high, indicating that no battery is present.

B. Detection of Battery Presence

If, however, a battery is present (as shown in FIG. 1), the various signals within the battery charger will not behave as depicted in FIGS. 3A-F, but will appear as shown in FIGS. 4A-F, instead. As seen in FIGS. 4A and 4B, VP and $\overline{\text{SAMPLE}}$ remain unchanged from the waveforms shown in FIGS. 3A and 3B, as their operation does not depend upon whether a battery is or is not present.

However, as shown in FIG. 4C, the battery substantially clamps VN to the voltage $V_{BATT}$ output by the battery 8. $V_{BATT}$ will always be within the range $VN_{MIN}$ to $VN_{MAX}$, by definition of the components used in the battery charger 2. For example, $VN_{MIN}$ may be ground or 0 volts, and $VN_{MAX}$ is the maximum voltage which the battery charger 2 can produce for charging any battery. Within this range, the DC amplitude of $V_{BATT}$ does not affect the operation of the battery detector 12. Because VN is not varying, and is held substantially DC, the DC blocking capacitor 20 isolates the ground sense input 24 from the battery 8.

As shown in FIG. 4D, VL is then clamped at $VL_{MAX}$ by the zener diode 22 because VN is not varying (has no AC component). In one mode, VL will thus be held at 0.7 volts, which is the forward drop across the zener diode 22. This is all true regardless of the DC magnitude of $V_{BATT}$. The key feature is that without a battery, VN fluctuates, but with a battery, VN is held substantially constant at $V_{BATT}$. Because the battery is only subjected to a voltage substantially the same as $V_{BATT}$, the same control circuitry may be used in charging a completely discharged 1.5 volt AAA cell which is producing 0 volts, or a half-charged 9 volt cell which is producing 4.5 volts, or a fully-charged 18 volt cell, and so forth. A 1.5 volt battery will never be subjected to a charging voltage significantly higher than 1.5 volts so that it will not be damaged, but a 24 volt battery will receive 24 volts so that it will become charged.

When a battery is present, there is no AC fluctuation in VN which would allow the level translator to cause fluctuation in VL, so VL rests at $VL_{MAX}$, as shown in FIG. 4D. Because VL never goes below $VT_3$, $\overline{\text{BATT}}$ is never brought up above the low value. Each time $\overline{\text{SAMPLE}}$ goes low, $\overline{\text{BATT}}$ will also be low, so the battery detection signal LATCHED $\overline{\text{BATT}}$ always remains low, as shown in FIG. 4F, indicating that a battery is present.

XI. Operation of the Charge Controller and Charge Driver

Please refer again to FIG. 1. While the charge drive signal remains at a constant DC level, the DC blocking capacitor 106 isolates the SCR 108 from the charge drive signal, and the SCR 108 does not connect the battery 8 to the power supply 58. However, when the charge controller 104 pulses the charge drive signal, an AC component of the charge drive signal passes through the DC blocking capacitor 106 and turns the SCR 108 on, such that power is coupled through from the power supply 58 to the battery 8, to recharge the battery 8.

Once turned on, the SCR 108 will remain on until the current through the SCR 108 falls below a holding current threshold $I_{HOLD}$ of the particular SCR 108. Because VP has a full-wave rectified waveform, and its voltage periodically falls to ground (i.e. once each 8.3 milliseconds), the SCR 108 will repeatedly shut off once approximately each 8.3 milliseconds, after having conducted only a brief pulse of charging current through to the battery 8. Once it turns off, the SCR 108 will not turn back on again, regardless of the waveform applied at its anode 110, until another control signal pulse is applied at its gate 114.

Thus, the more frequent the charge drive signal pulses are, the more frequently the SCR 108 will be turned on, and the more total charging current will be provided to the battery 8 during any given time period. By varying the time between control signal pulses, the apparatus in effect controls how much charge current is coupled through to the battery. The charge controller 104 is responsive to the C-rate controller 100 and to other logic (not shown) within the IC 10, to selectively control the frequency at which control pulses are coupled through to the SCR 108. To perform a fast charge, for example, the charge controller 104 may send a control pulse at nearly every clock cycle. To perform a quick charge, the charge controller 104 may send a control pulse once every three clock cycles. To perform a trickle charge, the charge controller 104 may wait fifteen clock cycles between control pulses. These numbers are only exemplary. Actual frequencies must be determined according to the selected charge rate, the nature of the individual battery to be charged, the ambient and battery temperatures, and so forth. Further details of the frequency of provision of the charge drive signal $V_{DRIVE}$ may be understood by referring to the cross-referenced Application.

XIII. Overall Operation of the Battery Charger Logic

Figure 5B:
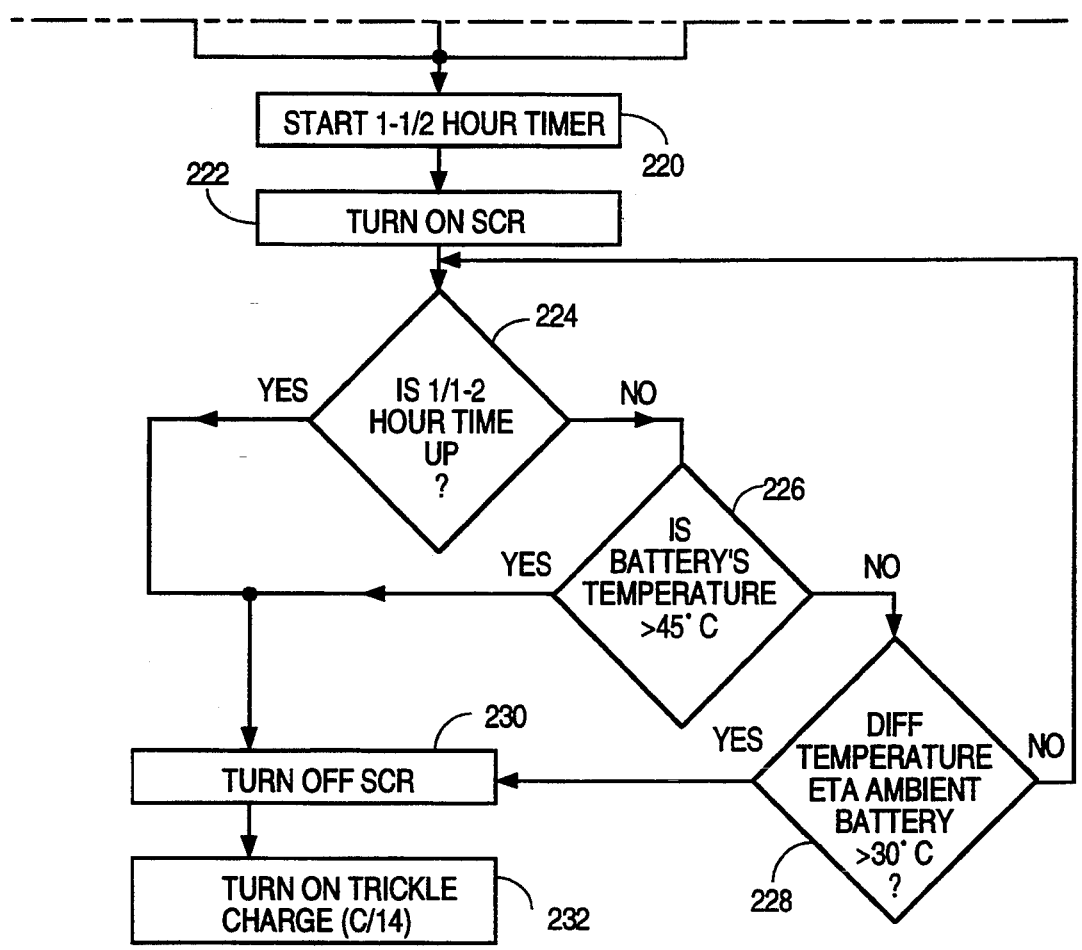
FIG. 5 is a flow-chart of the operation of the battery charger.
Figure 6A:
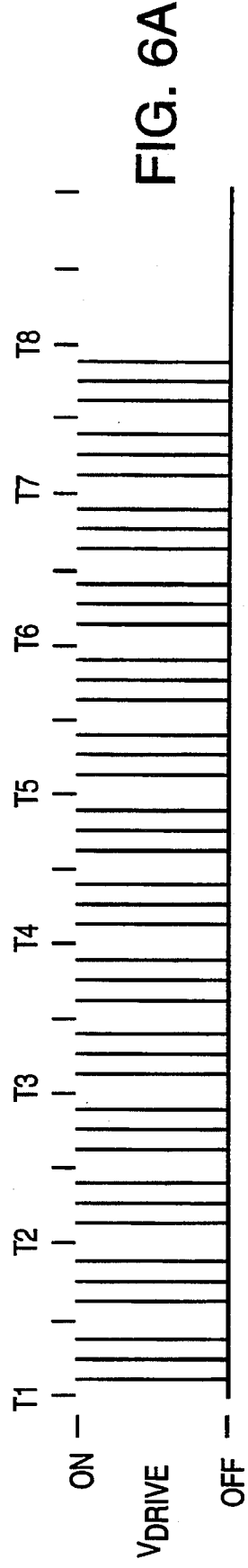
FIGS. 6A-D are signal graphs showing two modes of the charge drive signal and the corresponding two modes of the power supply capacitor voltage, for a C-rate charge and a C/2-rate charge, respectively.
Figure 6B:
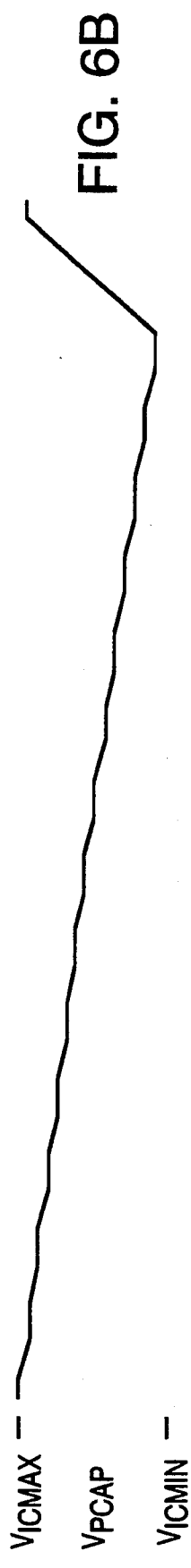
Figure 6C:
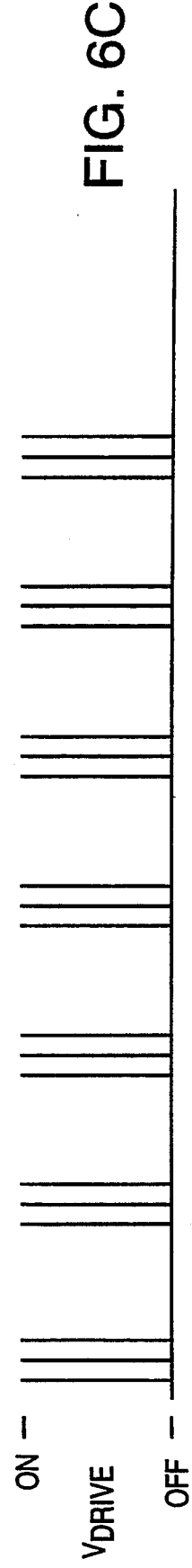
Figure 6D:
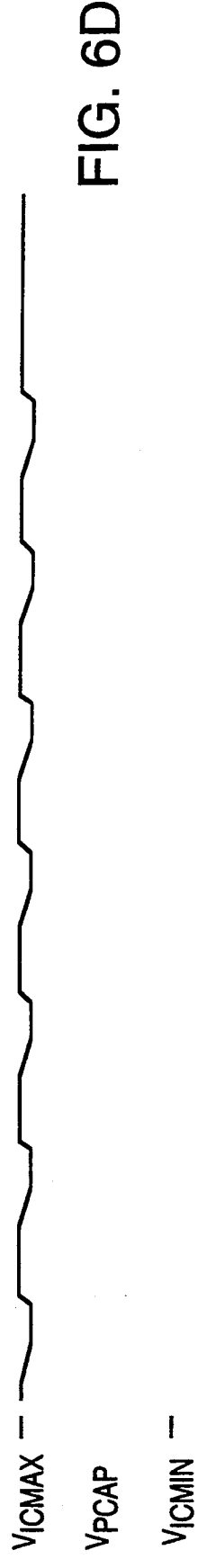

Please refer now to FIGS. 1 and 5. FIG. 5 depicts the operation of the battery charger in the form of a flowchart 200. Operation logically begins at the starting point 202. If no power is present, operation remains at the query block 202.

Assuming that there is power, the query block 204 checks whether a battery is present for charging. If not, operation remains at the query block 204 until a battery is detected as described above. If a battery is present for charging, operation passes to block 206, which resets a 1½-hour timer (not shown) in the timer 88. After the timer is reset, operation continues at block 208 which causes a one-minute pause to wait for the thermistor 80 in the temperature sensor 64 to sense the temperature of the battery. Further details of this one-minute waiting period are available in the cross-referenced Application.

From block 208, operation passes to query block 210 which checks whether the battery is sufficiently cool that charging will not endanger the battery, the charger, and passersby. A maximum safe battery temperature may, for example, be 30° C. The magnitude of the maximum safe battery temperature is set by the resistive value of the maximum start temperature resistor 74.

If the battery is too hot, operation remains at query block 210 until the battery has cooled off. When the battery is sufficiently cool, operation continues at query block 212, which checks whether the battery is sufficiently warm that it will take a charge. A minimum chargeable battery temperature may, for example, be 10° C. The magnitude of the minimum chargeable battery temperature is set by the resistive value of the minimum battery temperature resistor 76.

If the battery is too cold, operation remains at the query block 212 until the battery warms up. When the battery is warm enough, operation continues at query block 214 which checks whether the user has selected the C rate or the C/2 rate for charging the battery. Accordingly, operation passes through either block 216 or block 218 to set the charger to perform at the selected charge rate.

From there, operation continues at block 220 which starts the 1½-hour timer. Then, operation passes to block 222 which turns on the SCR 108 by repeatedly sending the charge drive signal as explained above. With the SCR 108 turned on, the battery 8 is being charged by current passing from the power supply 58 through the SCR 108 to the battery 8, as explained above. After the SCR 108 is turned on, operation continues at query block 224, which monitors whether the 1½-hour timer has expired.

If the time has not yet expired, operation passes to query block 226, which checks whether the battery 8 has become overheated, in an absolute sense, by the charging. An absolute overheat threshold temperature may, for example, be 45° C. The magnitude of the absolute overheat threshold is set by the resistive value of the absolute battery overheat temperature resistor 78.

If the battery has not become overheated, operation passes to a query block 228, which checks whether the battery 8 is overheated relative to the ambient temperature around the battery charger. The maximum difference, or window, by which the battery 8 is allowed to exceed the ambient temperature is set by the relative resistive values of the battery temperature resistor 72 and the thermistor 70. The window may, for example, be 30° C.

If the battery is not too hot compared to the ambient environment, operation returns to the query block 224 for continual monitoring of the battery temperature as described above.

If, at the appropriate blocks, either the 1½-hour time limit has expired, or the battery has become too hot either absolutely or relative to the ambient temperature, operation passes to block 230 which turns off the SCR 108 to stop the fast C rate or C/2 rate charging of the battery. Then, operation passes to block 232 which starts a trickle charge of the battery, to maintain the battery in its fully-charged state if the full 1½-hour time was used, or in as fully-charged a state as the battery was in when it overheated. The trickle charge rate may, for example, be C/16. In one mode, the battery will remain under trickle charge until removed from the battery charger.

XIV. Conclusion

It will be understood that the invention has been described in accordance with embodiments shown in the Figs., and in accordance with specific modes of construction and operation. However, various changes in the details of the apparatus and method may be made without departing from the spirit and scope of this disclosure. The scope of the invention is to be determined according to the following claims.

I claim:

1. An apparatus for detecting the presence or absence of a battery which has a terminal electrically connectable to and removable from the apparatus, the apparatus comprising:

a battery detection node (14) at which the terminal of the battery is electrically connectable to the apparatus, wherein when the battery is not present, a voltage (VN) at the battery detection node fluctuates, and wherein when the battery is present, the battery holds the voltage at the battery detection node substantially constant; and a battery detector (12), coupled to the battery detection node, for detecting whether the voltage is fluctuating or is substantially constant, and thereby sensing whether the battery is or is not connected to the apparatus;

wherein the battery detector further comprises:
   a ground sense input node (24); and
   a level shifter (18), coupled to the battery detection node and the ground sense input node, for shifting the voltage at the battery detection node into a shifted voltage (VL) at the ground sense input node.

2. The apparatus of claim 1, wherein the level shifter comprises:
   a capacitor (20) coupled between the battery detection node and the ground sense input node; and
   a zener diode (22) coupled to the ground sense input node.

3. The apparatus of claim 1, wherein:
   when the battery is present, the shifted voltage remains above a predetermined threshold ($VT_3$); and
   when the battery is not present, the shifted voltage goes below the predetermined threshold.

4. The apparatus of claim 3, wherein the means for sensing further comprises:
   a ground sense comparator (26), coupled to the ground sense input node, for detecting whether the shifted voltage is below the predetermined threshold, and for providing a battery detection signal ($\overline{BATT}$) indicating whether the shifted voltage is below the predetermined threshold.

5. The apparatus of claim 4, wherein the ground sense comparator further comprises:
   an integrated circuit in which logic functions of the ground sense comparator are embodied.

6. The apparatus of claim 4, wherein:
   the battery detector further comprises a latch system (48), coupled to the ground sense comparator and to receive a sampling signal ($\overline{SAMPLE}$), for providing a latched battery detection signal (LATCHED $\overline{BATT}$) according to the battery detection signal and in response to the sampling signal.

7. The apparatus of claim 4 wherein the ground sense comparator further comprises:
   first, second, third, and fourth transistors (30, 32, 34, 36) each having a first power terminal coupled to receive a power signal ($V_{DD}$), and each having a second power terminal, and each having a control terminal, the control terminals of the first, second, third, and fourth transistors being coupled together and to the second power terminal of the first transistor;

a fifth transistor (38) having a first power terminal coupled to the second power terminal of the first transistor, and having a second power terminal coupled to receive a power reference (ground), and having a control terminal coupled to receive a bias reference signal ($V_{BIAS}$);

sixth and seventh transistors (40, 42), each having a first power terminal coupled to the second power terminal of the third and fourth transistors, respectively, and each having a second power terminal, and each having a control terminal, the control terminals of the sixth and seventh transistors being coupled together and to the second power terminal of the fourth transistor; and eighth and ninth transistors (44, 46), each having a first power terminal coupled to the second power terminals of the sixth and seventh transistors, respectively, and each having a second power terminal coupled to receive the power reference, and each having a control terminal coupled to the ground sense input node and to ground, respectively; wherein the ground sense comparator receives the shifted voltage at the control terminal of the eighth transistor, and provides the battery detection signal at the second power terminal of the third transistor.

8. The apparatus of claim 7, wherein the level shifter comprises:

a capacitor (20) coupled between the battery detection node and the ground sense input node; and a zener diode (22) coupled to the ground sense input node.

9. The apparatus of claim 7, wherein the battery detector further comprises:

a latch system (48), coupled to the second power terminal of the third transistor to receive the battery detection signal, for providing a latched battery detection signal (LATCHED BATT) according to the battery detection signal and in response to a sampling signal.

10. An apparatus for detecting, before a significant charging current is delivered for charging a battery, the presence or absence of said battery, where said battery has a terminal electrically connectable to and removable from the apparatus, the apparatus comprising:

current-limiting means for delivering a current-limited probe signal having an AC component to a battery detection node at which the terminal of the battery is electrically connectable to the apparatus, wherein when the battery is not present, a fluctuating voltage develops at the battery detection node due to the probe signal, and wherein when the battery is present, the battery holds the voltage at the battery detection node substantially constant; and a battery detector, coupled to the battery detection node, for detecting, independently of the absolute Dc voltage of a potentially present battery and before a significant amount of charge is delivered for charging the potentially present battery, whether the voltage at the battery detection node is fluctuating or is substantially constant, and thereby sensing whether the battery is or is not connected to the apparatus, said battery detector including DC blocking means, coupled to the battery detection node, for blocking a DC component of the voltage while passing through, for purposes of said detection of the fluctuating or nonfluctuating attribute of said voltage, an AC component of the voltage;

wherein the battery detector further comprises:

first, second, third, and fourth transistors (30, 32, 34, 36) each having a first power terminal coupled to receive a power signal (VDD), and each having a second power terminal, and each having a control terminal, the control terminals of the first, second, third, and fourth transistors being coupled together and to the second power terminal of the first transistor;

a fifth transistor (38) having a first power terminal coupled to the second power terminal of the first transistor, and having a second power terminal coupled to receive a power reference (ground), and having a control terminal coupled to receive a bias reference signal ($V_{BIAS}$);

sixth and seventh transistors (40, 42), each having a first power terminal coupled to the second power terminal of the third and fourth transistors, respectively, and each having a second power terminal, and each having a control terminal, the control terminals of the sixth and seventh transistors being coupled together and to the second power terminal of the fourth transistor; and eighth and ninth transistors (44, 46), each having a first power terminal coupled to the second power terminals of the sixth and seventh transistors, respectively, and each having a second power terminal coupled to receive the power reference, and each having a control terminal, the control terminal of the eighth transistor being coupled to the battery detection node, and the control terminal of the ninth transistor being coupled to ground.

11. An apparatus for charging a battery, the apparatus comprising:

means (12) for detecting and indicating whether the battery is coupled to the apparatus independently of absolute battery voltage; and charging means (104, 108), responsive to the means for detecting and indicating, for providing a charging signal to the battery when the battery is indicated to be coupled to the apparatus;

wherein the battery to-be-charged includes a battery diode, and the apparatus further comprises:

compensating means (120), couplable to the to-be-charged battery, for compensating for the voltage drop of the battery diode such that the means for detecting and indicating will not sense a fluctuating voltage drop across the battery diode during charging operations of the apparatus.

12. A battery charger for charging a battery which is connectable thereto, the charger comprising:

first and second battery nodes connectable to said battery;

charge supply means for supplying a charging signal to at least one of the first and second battery nodes, where the charging signal includes a DC component and an AC component, and where the AC component is substantially absorbed by the battery when the battery is connected to the first and second battery nodes; and battery detecting means, coupled to the least one of the first and second battery nodes receiving the charging signal, for separating the AC component of the charging signal from the DC component, comparing the magnitude of the separated AC component against a predefined threshold level, and generating a battery-absent signal when the magnitude of the separated AC component exceeds the predefined threshold level;

wherein the battery detecting means includes:

comparison means for producing a comparison signal indicating the relation between the magnitude of the separated AC component and the predefined threshold level; and gating means, coupled to the comparison means, for gating the comparison signal during a time span when the AC component is at or near its maximum magnitude, and for producing a gated comparison signal indicating the relation between the magnitude of the separated AC component and the predefined threshold level when the AC component is at or near its maximum magnitude.

13. A battery charger according to claim 12 wherein the battery detecting means further includes:

latching means, coupled to the gating means, for latching the gated comparison signal and producing therefrom a latched battery-absent signal that indicates whether the battery is or is not connected to the first and second battery nodes.

14. A battery charger according to claim 13 wherein the charge supply means receives and responds to the latched battery-absent signal by refraining from supplying the charging signal when the latched battery-absent signal indicates that the battery is not connected to the first and second battery nodes.

15. A battery charger for charging a battery which is connectable thereto, the charger comprising:

first and second battery nodes connectable to said battery;

charge supply means for supplying a charging signal to at least one of the first and second battery nodes, where the charging signal includes a DC component and an AC component, and where the AC component is substantially absorbed by the battery when the battery is connected to the first and second battery nodes; and battery detecting means, coupled to the least one of the first and second battery nodes receiving the charging signal, for separating the AC component of the charging signal from the DC component, comparing the magnitude of the separated AC component against a predefined threshold level, and generating a battery-absent signal when the magnitude of the separated AC component exceeds the predefined threshold level;

wherein the battery detecting means includes:

clamping and level-shifting means for shifting and clamping the separated AC component of the charging signal to produce therefrom a clamped signal having predefined minimum and maximum magnitudes; and comparison means, receiving the clamped signal, for producing therefrom a comparison signal indicating the relation between the magnitude of the clamped signal and a predefined threshold magnitude.

16. A method for detecting the presence of a battery wherein the battery, if present, substantially absorbs a low-level AC signal presented to it, said method comprising the steps of, prior to charging the battery:

supplying an absorbable AC signal to a battery connecting post;

separating an AC component of a voltage developed at the battery connecting post from any DC component simultaneously developed thereat; and determining whether the separated AC component is of substantial or insubstantial magnitude, the latter indicating the battery is present while the former indicates the battery is absent;

wherein the battery optionally includes an internal diode, the method further comprising the step of supplying a forward biasing current to the battery for keeping the internal battery diode, if present, in a forward biased state.

* * * * *

UNITED STATES PATENT AND TRADEMARK OFFICE
CERTIFICATE OF CORRECTION

PATENT NO.    :  5,422,560
DATED         :  June 6, 1995
INVENTOR(S)   :  Raymond C. Yan It is certified that error appears in the above-identified patent and that said Letters Patent is hereby corrected as shown below:

Col. 1, line 14     after "(now abandoned)" insert
                    --by Raymond C. Yan is related to--

Signed and Sealed this

Eighteenth Day of June, 1996

Attest:

BRUCE LEHMAN

*Attesting Officer*       *Commissioner of Patents and Trademarks*